United States Patent [19]

Blancheville et al.

[11] 3,813,617

[45] May 28, 1974

[54] FREQUENCY TO AMPLITUDE MODULATED WAVE CONVERTER

[75] Inventors: Pierre J. Blancheville, Courbevoie; Guy Brun, Rennes; Pham Tat Dat, Bagneux, all of France

[73] Assignee: Office De Radiodiffusion-Television Francaise, Paris, France

[22] Filed: Feb. 23, 1973

[21] Appl. No.: 335,299

[30] Foreign Application Priority Data

Feb. 28, 1972 France .............................. 72.06662

[52] U.S. Cl. ............ 332/31 R, 178/5.4 C, 325/139, 329/145, 332/41, 332/48

[51] Int. Cl. ............................................... H03c 1/00

[58] Field of Search ............ 332/31 R, 31 T, 41, 48, 332/1; 329/145; 325/139, 46; 178/5.4 C

[56] References Cited

UNITED STATES PATENTS

| | | | |
|---|---|---|---|
| 2,358,152 | 9/1944 | Earp | 332/1 |
| 3,033,921 | 5/1962 | Van De Polder | 178/5.4 C |
| 3,290,433 | 12/1966 | De France et al. | 325/46 X |
| 3,324,400 | 6/1967 | Battail et al. | 329/145 X |
| 3,348,168 | 10/1967 | Melchior et al. | 332/1 |
| 3,387,220 | 6/1968 | Lender | 329/145 X |

*Primary Examiner*—Alfred L. Brody

[57] ABSTRACT

A device for direct conversion of a frequency-modulated wave having a zero-modulation frequency $f_1$ into an amplitude-modulated wave having a carrier frequency $f_0$. It comprises two circuits having a common input, the first of which includes a first amplitude modulator carrier-supplied by a local oscillator of frequency $f_0$ and has its output fed to one of the inputs of a second amplitude modulator, the other output of which receives signals from said common input through the second of said circuits. The output of the second modulator is connected to a load circuit through a low-pass filter. The device is further characterized in that one of said circuits includes a frequency filter having a transmission coefficient linearly varying as a function of frequency in the vicinity of frequency $f_1$, while the other channel includes a delay network.

8 Claims, 4 Drawing Figures

FREQUENCY TO AMPLITUDE MODULATED WAVE CONVERTER

The invention relates to a novel device for directly converting a high-frequency wave, frequency modulated by a modulating signal made up of components occupying a frequency band called the "base band," into a second high-frequency wave, which is amplitude-modulated by the same modulating signals.

More specifically, the invention aims to provide circuitry for making the desired conversion without necessitating the complete demodulation of the frequency-modulated wave (i.e. until modulating signals are obtained in the base band), followed by the amplitude-modulation of a new high-frequency wave, using the last-mentioned modulating signals.

The technical advance resulting from the invention may be more easily understood from the following. Sound or television broadcasting signals, which are at present amplitude-modulated when transmitted by ground-based networks, will probably in the near future be transmitted by frequency modulation from artificial earth satellites, owing to the improvement in the signal-to-noise ratio and in the power saving as a result of frequency modulation. It will be advantageous, therefore, if existing receivers can still be used, merely by inserting a device according to the invention between the receiving aerial and the input of a conventional receiver, without any internal modifications being necessary.

According to a first embodiment, the invention provides a device for converting a frequency-modulated input wave, having a normal or zero-modulation frequency $f_1$, into an amplitude-modulated output wave having a normal carrier frequency $f_o$, the device comprising:

two transmission channels having a common input to which the input wave is applied;

in the first channel, a linear frequency filter system having a transmission coefficient whose modulus varies in linear manner, near the frequency $f_1$, in dependence on the frequency of the signals applied to its input, the coefficient being zero for a given frequency $f_2$;

in the second channel, a first amplitude modulator having a first input connected to the filter output, a second input energized by a local oscillator having a frequency $f_o$, and an output connected to one input of a second amplitude modulator;

in the second channel, a circuit connecting the input thereof to a second input of the second modulator, the circuit comprising a delay network if required; and a low-pass filter, the input of which is connected to the output of the second modulator and the output of which is connected to a load circuit.

According to a second embodiment, the invention provides a device for converting a frequency modulated input wave having a normal or zero-modulation frequency $f_1$ into an amplitude-modulated output wave having a normal frequency $f_o$, the device comprising:

two transmission channels having a common input, to which the input wave is applied;

in the first channel, a linear frequency filter having a transmission coefficient whose modulus varies in linear manner, near the frequency $f_1$, in dependence on the frequency of the signals applied to its input, the coefficient being zero for a given frequency $f_2$;

in the second channel, a first amplitude modulator having a first input connected to the input of the second channel via a delay network if required, a second input supplied by a local oscillator having a frequency $f_o$, and an output connected to one input of a second amplitude modulator, another input of which is connected to the filter output; and a low-pass filter, the input of which is connected to the output of the second modulator and the output of which is connected to a load circuit.

In both embodiments, the amplitude modulators may be balanced modulators, and the frequency difference $(f_2-f_1)$ is so selected that, if the input wave is not modulated, the output wave has a predetermined amplitude which will be called the "normal amplitude" thereof.

The aforementioned balanced modulators may be of any conventional kind or may be replaced by analog multipliers.

When broadcasting in certain cases, the input wave may be high-frequency treated at the place where the signals are transmitted, in which case it has to be given complementary treatment at the input of the device, to ensure that the converter receives the initial constant-amplitude wave. The last-mentioned treatment is usually called "H.F. pre-emphasis." Likewise, the base signal may have been pre-emphasized in the base band before transmission, in which case the converter output wave will be amplitude-modulated by the pre-emphasized base signal. In order to convert the wave back to normal standards, it has to be transmitted through a deemphasis network having a transmission characteristic centered around the frequency $f_o$.

The invention will be more clearly understood from the following detailed description, made with reference to the accompanying drawings, in which.

Figure 1:
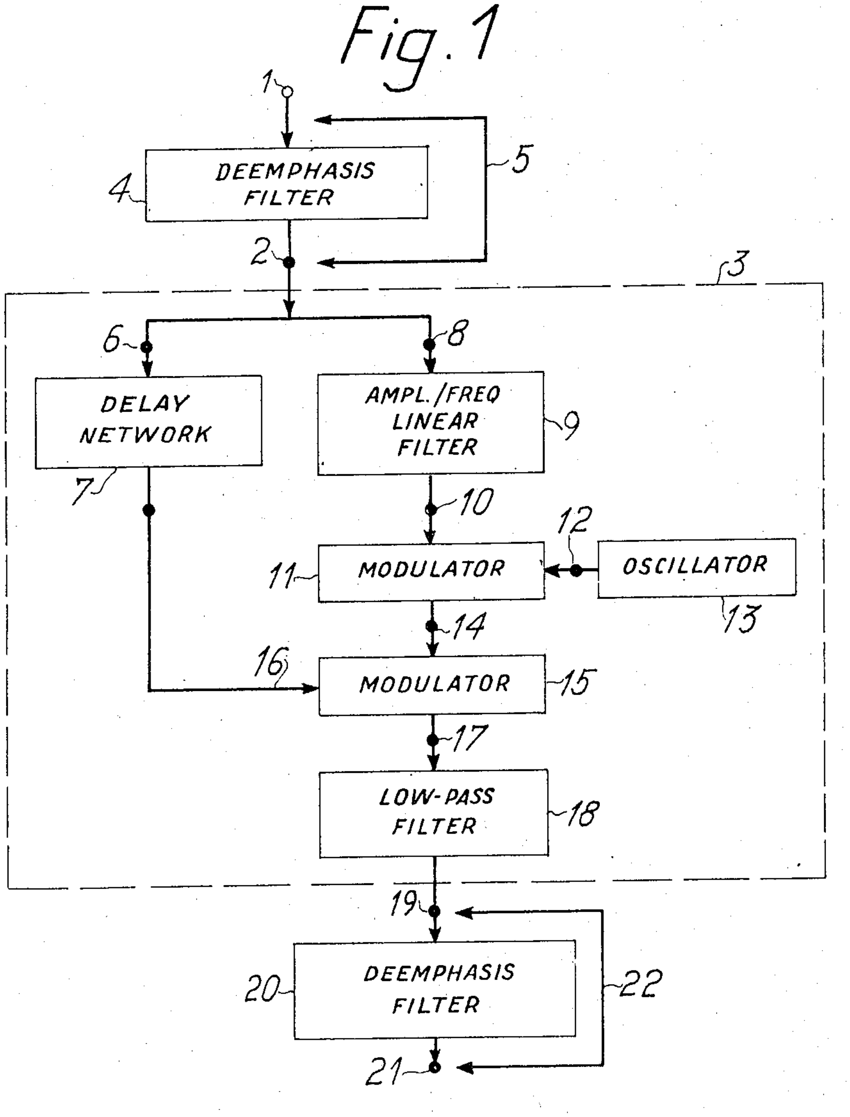
FIG. 1 is a block diagram of a first embodiment of the invention.
Figure 2:
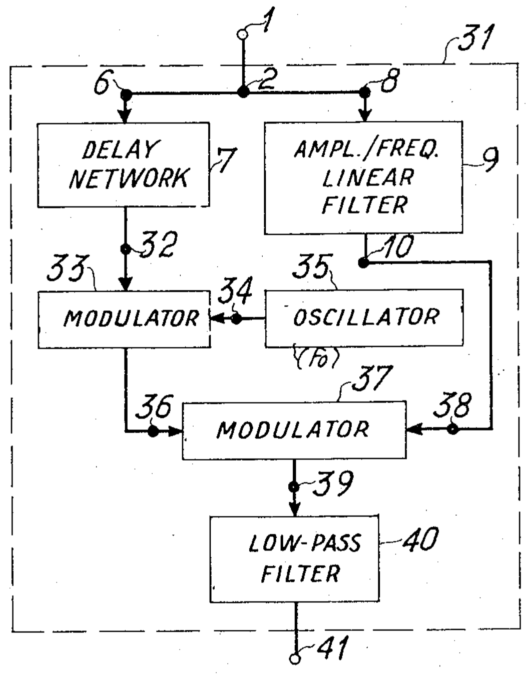
FIG. 2 is a block diagram of a second embodiment of the invention.
Figure 3:
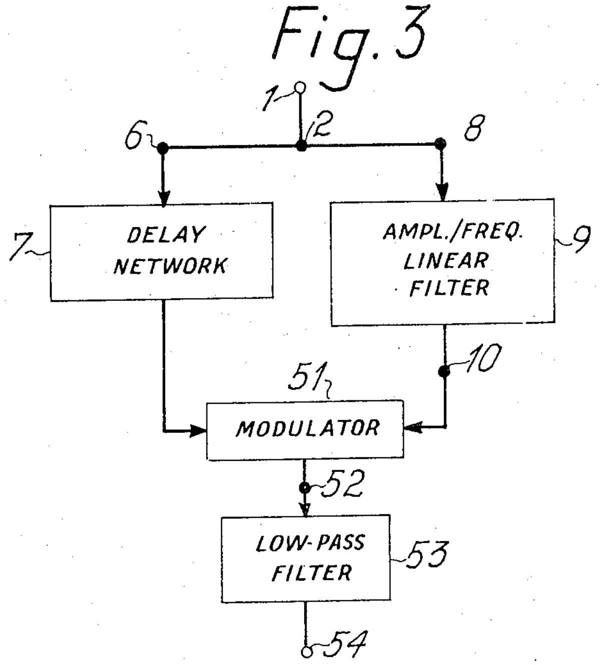
Figure 4:
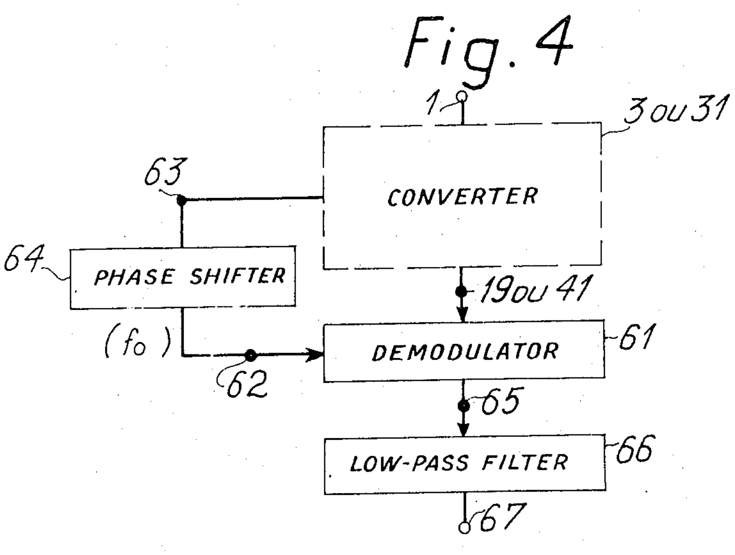

FIG. 3 is a diagram of an alternative embodiment for use as an ordinary frequency demodulator, i.e. in the case when the carrier frequency $f_o$ of the output wave is made zero, in which case the load circuit receives signals having the same shape as the baseband modulating signals which modulate the input wave; and FIG. 4 is a diagram of a circuit according to FIG. 1 of FIG. 2 combined with means for synchronously demodulating the output wave having a carrier frequency $f_o$, in order to ensure that the signals obtained in the load circuit have the same shape as the base-band modulating signals which modulate the input wave.

FIG. 1 shows an input terminal 1 to which an input wave is applied, the wave having a constant amplitude and an instantaneous frequency $f$ which varies in proportion to the instantaneous amplitude of the modulating signal and which has a "normal" value $f_1$, in the absence of modulation. A "de-emphasis" filter 4 can be inserted between input terminal 1 and the input terminal 2 of the actual device 3 for converting frequency-modulation into amplitude-modulation. Filter 4 is not essential in all cases, but only when the input wave applied at 1 has been emphasised, when transmitted, at the frequencies most remote from the normal frequency $f_1$; as is known, such emphasis may be desirable under certain conditions of the transmission medium. In most case, therefore, filter 4 may be replaced by a direct connection 5 between points 1 and 2.

The input terminal 2 of device 3 is connected firstly to the input 6 of a delay network 7, the purpose of which will be explained hereinafter, and secondly to the input 8 of a filter 9 which, for want of a better term, will hereinafter be called a "linear amplitude-frequency filter" or, more briefly, a "linear filter." Near frequency $f_1$, filter 9 has a transmission coefficient (the ratio of the output to the input voltage), the modulus of which may be represented by a linear function of frequency $f$ which takes the zero value at a certain selected frequency $f_2$, the variation in the phase shift being a function of the frequency corresponding to a substantially constant group propagation time T. Filters of this kind are well known and are frequently used in conventional frequency-modulated signal demodulators, in which they are disposed in front of an amplitude detector.

If f, as before, denotes the instantaneous frequency of the signal applied at 8 and $A(t)$ denotes the instantaneous amplitude thereof ($t$ standing for time), we can write:

$$A(t) = A_o \cos(2\pi f_1 t + \phi)$$

$A_o$ being a constant and $\phi$ being a variable phase angle depending on the instantaneous amplitude $m(t)$ of the modulating signal, the last-mentioned amplitude being proportional to the derivative with respect to time $\phi'(t)$ of $\phi$. We can therefore write:

$$f = f_1 + 1/2\pi\ \phi'(t) \qquad (1)$$

If the aforementioned equations are given and are assumed relatively to the transmission coefficient, in amplitude and phase, of the linear filter 9, the instantaneous amplitude $A_1(t)$ of the signal received at the output 10 of filter 9 at the instant t may be represented by:

$$A_1(t) = kA_o[f_1 - f_2 + 1/2\pi\ \phi'(t)] \cos[2\pi f_1(t-T) + \phi(t-T)] \qquad (2)$$

$k$ being a constant.

Output 10 of filter 9 is connected to one input of modulator 11, whose other input 12 is energized by a local oscillator (13) which has a frequency $f_o$ and which supplies a voltage proportional to $\cos(2\pi f_o t)$ at 12. The signal received at the output 14 of modulator 11 is proportional to the product of $\cos(2\pi f_o t)$ and the expression $A_o(t)$. The instantaneous amplitude $A_2(t)$ of the signal received at 14 is proportional to the product of $A_1(t)$ and $\cos(2\pi r_o t)$ and may therefore be represented by the expression:

$$A_2(t) + k_1 A_o [f_1 - f_2 + 1/2\pi\ \phi'(t-T)] \cos[2\pi(f_1+f_o)t - 2\pi f_1 T + \phi(t-T)] + \cos[2\pi(f_1 - f_o)t - 2\pi f_1 T + \phi(t-T)] \qquad (3)$$

($k_1$ being another constant).

The signal $A_2(t)$ obtained from modulator 11 at 14 is applied to one input of a second modulator 15 whose other input 16 receives the signal $A(t)$ applied at 2 across the delay network 7, which has a delay time T. Consequently, the output 17 of modulator 15 delivers a signal having an instantaneous amplitude proportional to the product of $A(t-T)$ and $A_2(t)$, i.e., after all the calculation has been performed and apart from a constant factor, to the sum of the expression:

$$B(t) = B_o[f_1 - f_2 + 1/2\pi\ \phi'(t-T)] \cos 2\pi f_o t \qquad (4)$$

(where $B_o$ is a constant) and of frequency terms such as $(2f_1 + f_o)$ and $(2f_1 - f_o)$. If, as is usually the case, $f_o$ is selected so as to be much smaller than $f_1$, these terms are easily eliminated by a low-pass filter 18, the input of which is connected to the output 17 of modulator 15 and the output 19 of which is connected to the input of a de-emphasis filter 20 whose output is connected to the load terminal 21.

(As already explained with reference to filter 4, filter 20 is not essential except when a certain distortion, or "pre-emphasis at the modulating frequency," has been deliberately applied, on transmission, to the base-band modulating signals before frequency modulation; if no distortion is applied, filter 20 may be replaced by a direct connection 22).

It can be seen from expression $B(t)$ in equation (4) that the signal received at output 19 of low-pass filter 18 (which is also the output of converter 3) is none other than a carrier wave having a frequency $f_o$ and amplitude-modulated by the sum of a constant quantity proportional to $(f_1 - f_2)$ and a second quantity proportional to $1/2\pi\ \phi'(t)$, i.e. the instantaneous amplitude $m(t)$ of the original modulating signal taken in the base-band. We have therefore obtained the desired conversion of the input wave, which is frequency modulated from the zero-modulation frequency $f_1$, into an amplitude modulated wave having a constant frequency $f_o$, the latter however being modulated after a slight delay T with respect to the original modulating signal.

In this connection it may be noted, as shown by equation (3), that if the delay network 7 was replaced by a direct connection, the signal received at 19 at the output of 18 would still be slightly phase-modulated, the modulation being proportional to $[\phi(t) - \phi(t-T)]$. Usually, the last-mentioned modulation is unimportant, so that network 7 can often be omitted in practice.

As shown by expression 4, the choice of $(f_1 - f_2)$ also governs the level of the carrier wave of the amplitude-modulated signal received at 19. Accordingly, for a given value of $f_1$, $f_2$ may be chosen so as to adjust the carrier-wave level in accordance with predetermined standards, relatively to the maximum value of $1/2\pi\ \phi'(t)$ proportional to the instantaneous amplitude $m(t)$ of the modulating signal.

By way of non-limitative example, e.g. in a television transmission in which some of the information is frequency-modulated when transmitted, we may assume that the corresponding normal frequency $f_2$ is of the order of 115 MHz, with a peak-to-peak deviation of the frequency $1/2\pi\ \phi'(t)$ of the order of 4 MHz. If we make $f_o$ approximately 32 MHz, for example, the components to be eliminated from the output of modulator 17 will have frequencies of the order of 230 MHz, and can therefore be easily eliminated by the low-pass filter 18.

FIG. 2 shows a second embodiment of the invention. In FIG. 2, the de-emphasis filters 4 and 20 shown in FIG. 1 have been intentionally omitted at the input and output of converter 31 (which performs the same function as converter 3 in FIG. 1), since filters 4 and 20 are not indispensible and do not form part of the converter proper.

In FIG. 1, terminals 1, 2, 6, 8 and delay network 7 and linear filter 9 perform the same respective functions as the elements bearing the corresponding reference numbers in FIG. 1. On the other hand, the output of network 7 is connected to one input 32 of a modulator 33 whose other input 34 is energized by an oscillator 35 having a frequency $f_o$. The output of modulator 33 is connected to one input 36 of another modulator 37 whose other input 38 is connected to the output 10 of linear filter 9. The output of modulator 37 is connected at 39 to the input of a low-pass filter 40 whose output is connected to the load terminal 41; filter 40 and its input and output terminals 39, 41 perform the same functions as elements 17, 18, 19 in FIG. 1.

The operation of the device in FIG. 2 can be explained in exactly the same manner as for the device in FIG. 1, with the exception that the relative functions of modulators 33, 37 in FIG. 1 are reversed with respect to modulators 11, 15 in FIG. 1, and the functions of delay network 7 and filter 9 are similarly reversed.

FIG. 3 is a diagram of a simplified frequency demodulator, based on the principles adopted in the converters in FIGS. 1 and 2.

In FIG. 3, elements 1, 2, 6, 7, 8 and 9 respectively perform the same functions as the elements having similar reference numbers in FIG. 1. Demodulation is performed by connecting the output of delay network 7 to one input of the modulator 51 whose other input is connected to the output 10 of linear filter 9. The output of modulator 51 is connected to the input 52 of a low-pass filter 53 having a cut-off frequency which is low enough to eliminate frequencies of the order of the normal frequency $f_1$ of the wave applied at 1 to the input of the device, and which is therefore even more capable of eliminating higher frequencies. The signal modulating the applied wave is brought back to its base-band and received at the output 54 of filter 53.

The circuit in FIG. 3 may be supplemented, at its input and/or output, by de-emphasis filters when they are useful or necessary because of the modulation characteristics of the received wave.

Finally, FIG. 4 is a block diagram of a frequency demodulating assembly in which the received (frequency-modulated) wave is first converted into an amplitude-modulated wave, followed by synchronous demodulation by means of a local oscillation of frequency $f_o$ applied to a demodulator provided for the purpose.

In FIG. 4, elements 1, 3 (or 31) and 21 (or 41) respectively perform the same functions as the elements bearing similar reference numbers in FIGS. 1 and 2. Output 21 or 41 of converter 3 or 31 is connected to one input of a demodulator 61 whose other input 62 is energized, via a connection 63 and a phase-shifting network 64 if required, by a current having a frequency $f_o$, supplied by an oscillator (13 or 35) havng a frequency $f_o$ and included in devices 3 or 31 in FIGS. 1 or 2. Accordingly, the signal applied to the input of demodulator 61 comprises an amplitude-modulated carrier wave having a carrier frequency $f_o$, whereas the output 65 of 61 receives the modulated signal referred to its base-band, plus components having frequencies equal to or greater than $f_o$. The latter components are eliminated by a low-pass filter 66 whose input is connected to the output 65 of demodulator 61 and whose output 67 delivers the required base-band signal. Of course, if the device is to operate properly, there should be a suitable relation between the phases of the components of similar frequency $f_o$ applied to the two inputs of demodulator 61. This is ensured by phase-shifter 64, which is used in order to allow for the delay introduced by the low-pass filters 18, 40 in FIGS. 1 and 2. In any case, the adjustment of the resulting phase shift is not critical.

What we claim is:

1. A device for converting a frequency-modulated input wave, having for the zero-modulation condition a frequency $f_1$, into an amplitude-modulated output wave having a carrier frequency $f_o$, comprising two transmission channels having a common input to which said input wave is applied; a first channel comprising a first amplitude modulator having a first input connected to said common input by a first connecting circuit, a second input supplied by a local oscillator having a frequency $f_o$ and an output connected to one input of a second amplitude modulator; said second channel comprising a second connecting circuit connecting said common input to a second input of said second modulator; and a low-pass filter whose input is connected to the output of said second modulator and whose output is connected to a load circuit; said device being further characterized in that one of said connecting circuits comprises a frequency filter having a transmission coefficient whose modulus varies in linear manner with frequency in the vicinity of frequency $f_1$, said coefficient being zero for a given frequency $f_2$, whereas the other of said connecting circuits comprises a delay network.

2. A device according to claim 1, in which a de-emphasis filter is inserted in the common input to said two transmission channels.

3. A device according to claim 1, in which a de-emphasis filter is inserted between said low-pass filter output and said load circuit.

4. A device according to claim 1, in which the load circuit comprises a phase-shifting network oscillation means and an amplitude demodulator energized by said oscillation means, the input, having said frequency $f_o$ supplied by said local oscillator, through said phase-shifting network.

5. A device according to claim 4, in which said amplitude demodulator is followed in said load circuit by a further low-pass filter.

6. A device according to claim 1, in which said frequency filter is inserted in said first connecting circuit and said delay network is inserted in said second connecting circuit.

7. A device according to claim 1, in which said delay network is inserted in said first connecting circuit and said frequency filter is inserted in said second connecting circuit.

8. A frequency demodulator comprising a first and a second channel respectively connecting a first and a second input of a modulator to a common input, to which a wave to be frequency-demodulated is applied, a delay network and a filter having a transmission coefficient whose modulus varies in linear manner with frequency in the vicinity of the zero-modulation condition frequency of said wave, said delay network and filter being respectively inserted in said first and second channels between said common input and said first and second modulator inputs, and a low-pass filter connecting the output of said modulator to a load circuit.

* * * * *